Mar. 13, 1923. 1,448,227
J. J. A. MILLER ET AL
OIL CONTROLLED FURNACE DOOR ATTACHMENT FOR EFFECTING FUEL
COMBUSTION IN FURNACES
Filed Dec. 15, 1919   3 sheets-sheet 1
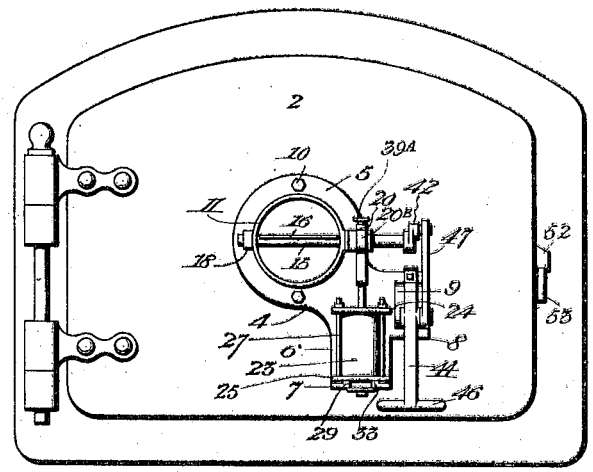
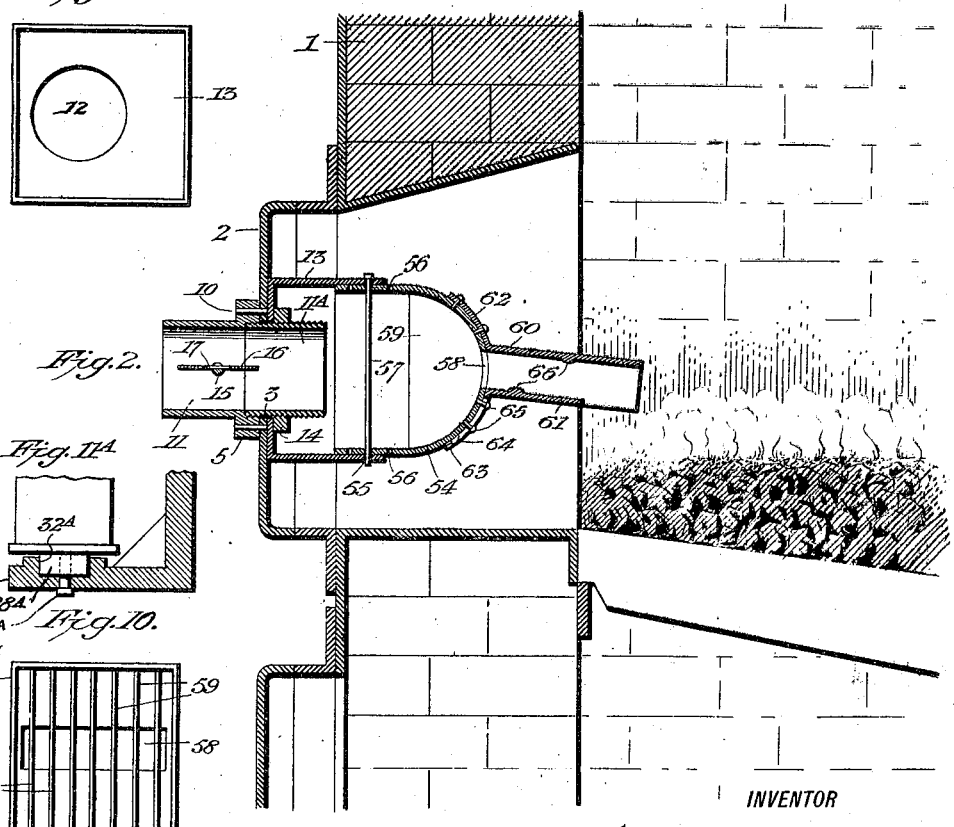
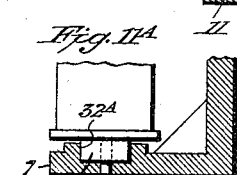
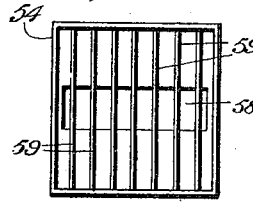
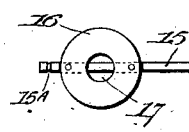
INVENTOR
John J. A. Miller.
By William A. Weigele.
H. S. Bailey.   ATTORNEY Mar. 13, 1923. 1,448,227
J. J. A. MILLER ET AL
OIL CONTROLLED FURNACE DOOR ATTACHMENT FOR EFFECTING FUEL
COMBUSTION IN FURNACES
Filed Dec. 15, 1919 3 sheets-sheet 2
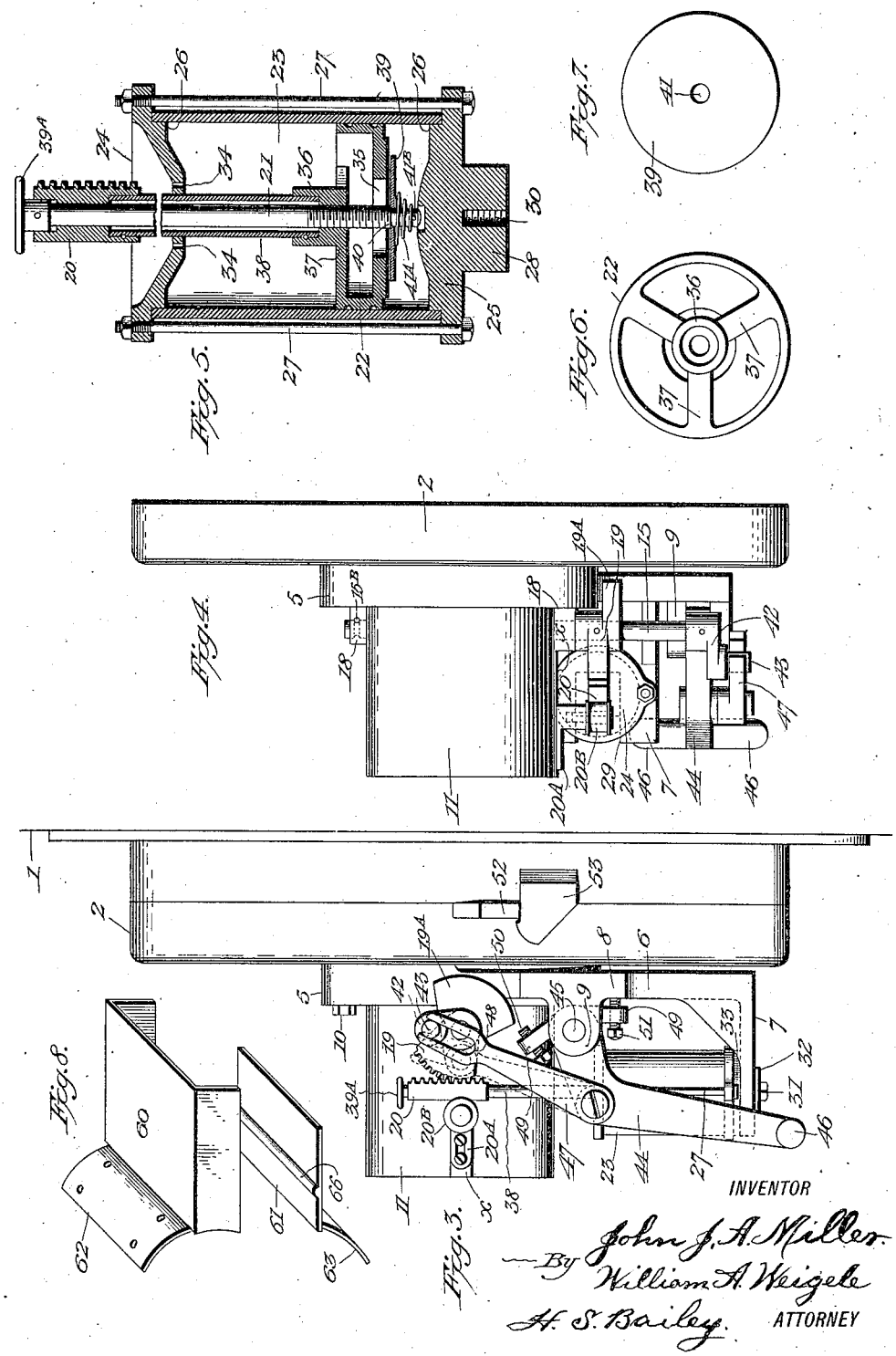
INVENTOR
John J. A. Miller
By William A. Weigele
H. S. Bailey ATTORNEY

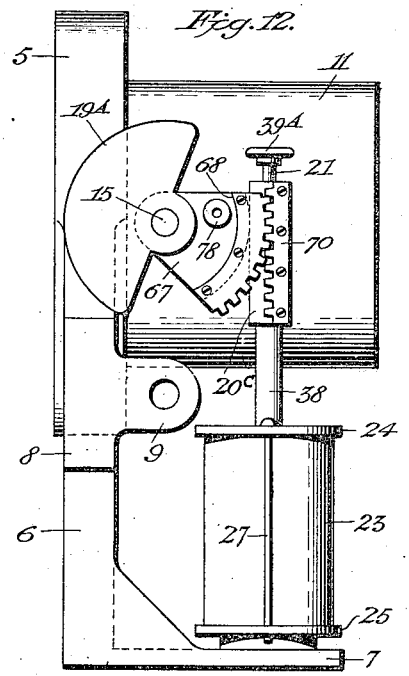
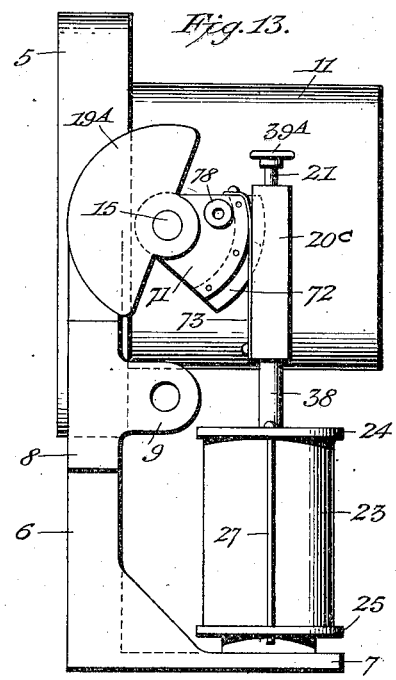
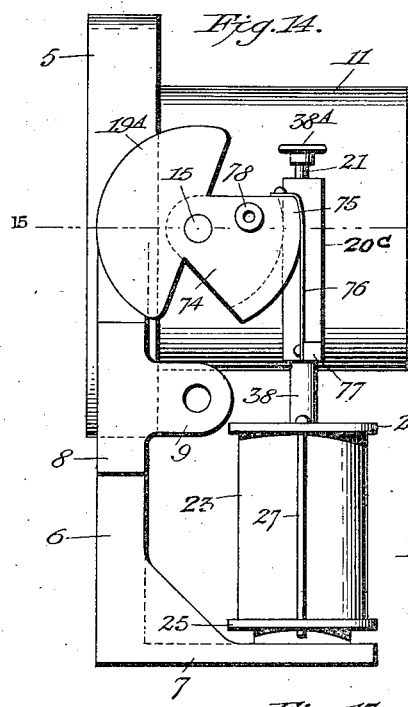
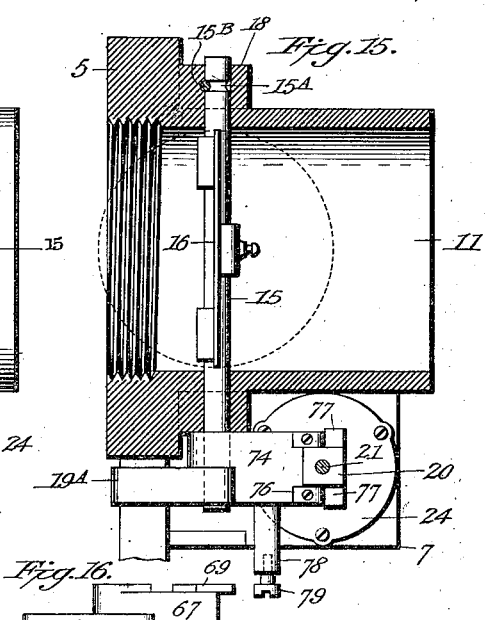

Patented Mar. 13, 1923.

1,448,227

UNITED STATES PATENT OFFICE.

JOHN J. A. MILLER AND WILLIAM A. WEIGELE, OF DENVER, COLORADO, ASSIGNORS, BY DIRECT AND MESNE ASSIGNMENTS, TO THE AUTOMATIC FURNACE OXIDATOR AND MANUFACTURING COMPANY, OF DENVER, COLORADO, A CORPORATION OF COLORADO.

OIL-CONTROLLED FURNACE-DOOR ATTACHMENT FOR EFFECTING FUEL COMBUSTION IN FURNACES.

Application filed December 15, 1919. Serial No. 344,859.

*To all whom it may concern:*

Be it known that we, JOHN J. A. MILLER and WILLIAM A. WEIGELE, citizens of the United States of America, residing at the city and county of Denver and State of Colorado, have invented a new and useful Oil-Controlled Furnace-Door Attachment for Effecting Fuel Combustion in Furnaces, of which the following is a specification.

This invention relates to improvements in furnace door attachments for effecting fuel combustion in furnaces.

The object of the invention is to provide an attachment for the doors of all classes of furnaces, whereby a regulated supply of heated atmospheric air is admitted to the combustion chamber of the furnace for a predetermined period after the coaling operation, the said air being discharged in a thin sheet over, and a slight distance above the coal bed, by which it is intimately mixed with the combustible gases and the floating particles of carbon and tar, thus causing complete combustion of these particles, and the consequent elimination of the unconsumed product, or smoke.

Further, to provide an attachment of this character, which can be applied to furnace doors of the commonly employed type, at a relatively small expenditure of time and expense, and which effects a maximum saving of fuel, together with the practical elimination of smoke.

Further, to provide an attachment for furnace doors, for the purpose above stated, which comprises an air receiving chamber, an automatically operating damper for admitting a volume of air thereto for a predetermined period after the coaling operation and thereafter limiting the air supply to a predetermined quantity, the said chamber having an outlet into the combustion chamber, the area of which can be increased or diminished to meet conditions, whereby a regulated supply of air can be admitted to the said combustion chamber in such manner as to intimately mix with the combustible gases therein, and thus effect complete combustion of the fuel.

These objects are attained by the mechanism illustrated in the accompanying drawings, in which:

Figure 1 is a front view of a furnace door equipped with the improved mechanism for effecting complete fuel combustion.

Fig. 2 is a vertical longitudinal sectional view through the furnace door and mechanism secured thereto.

Fig. 3 is an enlarged elevation of the same.

Fig. 4 is a plan view of the furnace door and damper operating mechanism.

Fig. 5 is a vertical sectional view of the oil valve which regulates the closing of the air inlet damper.

Fig. 6 is a plan view of the oil valve piston.

Fig. 7 is a plan view of the disk valve which regulates the drop of the piston.

Fig. 8 is a perspective view of the adjustable nozzle sections for varying the area of the air outlet.

Fig. 9 is an interior front view of that section of the air heating chamber which is secured to the furnace door.

Fig. 10 is a front elevation of the rear section of the heating chamber.

Fig. 11 is a plan view of the damper and its supporting rod.

Fig. 11$^A$ is a fragmental sectional view illustrating a slight modification in the manner of securing the oil cylinder to the bracket.

Fig. 12 is an enlarged fragmentary elevation of the mechanism, and showing a modification in the arrangement of the toothed segment and rack by which the piston valve is raised.

Fig. 13 is a similar view illustrating a modification in which an untoothed segment is employed and is connected to the piston valve rod by a flexible member.

Fig. 14 is also a fragmentary elevation similar to Fig. 13, but showing a segment having a grooved edge which straddles the piston valve rod, the groove in said segment forming flanges which are connected to the piston valve rod by flexible members.

Fig. 15 is a horizontal sectional view on the line 15—15 of Fig. 14, certain of the elements however being shown in plan.

Fig. 16 is a plan view of the segment shown in Fig. 12, and

Fig. 17 is a plan view of the segment shown in Figures 14 and 15.

Visible furnace smoke can only be abated by effecting complete combustion in the furnace, of the floating particles of carbon and tar, and this complete combustion is accomplished only by supplying air sufficient for the complete oxidation of all combustible matter, and the intimate mixing of the air with the combustible gases and the floating particles of carbon and tar. To bring about this result, heated air in large quantities should be admitted over the fire immediately after coaling and this quantity should be gradually reduced as the distillation of the volatile combustibles nears completion.

The improved furnace door attachment is adapted to meet these requirements by means of a combination of elements, which are arranged and constructed as follows:

Referring to the accompanying drawing: The numeral 1 indicates the front wall of an ordinary furnace, and 2 the fire door, to which the present invention is secured. These doors, as ordinarily constructed, have a circular group of air inlet holes, which are opened or closed by a damper, and in order to attach the invention, that part of the door surrounded by the circular group of holes is first removed, leaving a circular opening 3, in the door, as shown in Figure 2, such an opening being formed in new doors to which the attachment is to be secured.

Upon the outside of the furnace door is placed a bracket 4, comprising a ring-like member 5, and a depending plate member 6, which terminates at its lower end in a horizontal ledge or shelf 7. The depending member 6, has a lateral projecting portion 8, having integral apertured ears 9. The bracket 4, is secured upon the door partly by bolts or pins 10, and partly in a manner to be presently described, and the hole in the ring member 5, is threaded and registers with the hole 3, in the door. A relatively short outwardly projecting pipe 11, is integrally formed on the ring 5, and the ring is internally threaded. The inner end of a short threaded pipe or nipple 11$^A$, of the same diameter as the pipe 11, extends through a hole 12, in the closed end of one section 13, of a heating box and is screwed into the threaded ring 5, thus forming a continuation of the pipe 11, and a nut 14, is screwed upon the inner end of the pipe 11$^A$, and against the wall of the section 13, thereby securely clamping the said section against the inner side of the furnace door, and at the same time cooperating with the bolts or pins 10, in securing the bracket 4, to the door, the said pins preventing rotation of the bracket 4.

The diameters of the pipes 11, vary to suit the size and capacity of the furnaces upon which they are used, and the pipe 11$^A$, is centered in the door by the threaded ring member 5, and secured in the said ring by the nut 14.

On diametrically opposite sides of the pipe 11, and adjoining the ring 5, are formed bosses 18, having apertures which extend through the wall of the pipe.

Within the pipe 11, is pivotally mounted a rod 15, upon which is secured a damper 16, in the form of a circular disk, the rod extending through the oppositely positioned holes in the bosses 18. One end portion of rod 15, is formed with an annular groove 15$^A$, and a pin 15$^B$, is passed through the surrounding boss and engages the groove 15$^A$, and thus holds the rod 15, against endwise movement.

The damper may be provided with an axial air hole 17, which is of a diameter to meet the requirements occasioned by the size, capacity, and draft conditions of the furnace in question, or the air hole in the damper may be omitted, and the damper arranged to stand slightly open instead of entirely closing the pipe, thus admitting a limited supply of air at all times. The function of this damper is to admit a supply of air to a heating box to be presently described, and thence to the combustion chamber of the furnace, between the coaling periods, sufficient to effect complete combustion.

As the amount of air supplied after closing the damper varies according to the size and capacity of the furnace, the necessary amount must be determined in each case.

The damper rod 15, is held against lateral movement in either direction by the pin 15$^B$, as before mentioned, and thus prevents binding of the damper in the pipe, which would otherwise be caused by lateral movement of the rod. The rod 15, extends a suitable distance beyond one side of the pipe 11, and on this extended end and adjoining the boss 18, on that side of the pipe is secured a toothed segment 19, which meshes with a short rack bar 20, on the upper end of a tubular piston rod 38. The lower end of piston rod 38 is rigidly secured in the hub 36, of a piston 22, which is mounted in a cylinder 23, having upper and lower heads 24 and 25, respectively, provided with annular bosses 26. The bosses 26 fit tightly in the ends of the cylinder, and the heads 24, and 25, are held in place by threaded rods 27, which pass through holes in the heads and receive clamp nuts on their ends which are screwed against the adjacent head, as will be understood by reference to Fig. 5. The lower head 25, has a depending square lug 28, which fits in a slot or recess 29, in the ledge or shelf 7, at the lower end of the bracket 4, and this lug provided with a central, threaded hole 30. A bolt 31 is threaded into the hole 30 of the lug 28 and carries a washer 32 which is of greater diameter than the slot 29. When the bolt 31 is screwed far enough into the lug 28 the cylinder 23 is securely clamped to the shelf. Any other manner of securing the cylinder to the shelf 7, may be employed.

The central portion 33, of the shelf, upon which the head 25, rests, is slightly thicker than the outer portions thereof, so as to leave a space between the outer portion and the head, sufficient to accommodate the heads of the bolts 27, as will be understood by reference to Fig. 1. The upper cylinder head 24, is preferably concavo-convex as shown, and besides the axial hole therein, through which the piston rod 38, passes, it is also provided with a plurality of small holes 34, for a purpose to be presently explained.

A slight modification is shown in Fig. 11$^A$, in which the shelf 7, is provided with a circular socket 32$^A$, and the lower head 25, is provided with a circular lug 28$^A$, which fits into the socket and is clamped therein by a bolt 31$^A$, the lug being slightly longer than the depth of the socket, to prevent the head 25, resting upon the shelf 7.

A bracket arm 20$^A$ is bolted upon a flat portion X, on the air inlet pipe 11, and this bracket carries a roller 20$^B$, which engages the back edge of the rack bar 20, and supports it against the lateral pressure exerted by the toothed segment 19.

The piston 22, is of the form shown clearly in Figs. 5, and 6, and comprises a hollow, cylindrical portion having a bottom wall provided with an axial hole 35, the upper end of the piston consisting simply of the central hub 36, which is integrally connected to the surrounding piston wall by spider arms 37.

The hub 36, of the piston 22, has a threaded axial aperture, through which is screwed the lower threaded portion of a stem 21, the upper end of which extends through the rack bar 20, and is provided with a knurled thumb nut 39$^A$, having a depending hub portion which preferably enters a circular recess in the upper end of the rack bar, as shown in Fig. 5. The lower end of the stem 21, extends a suitable distance below the piston 22, and this portion of the stem is of slightly less diameter than the remaining portion of the stem, to form a shoulder 40, the threads on the stem terminating at the shoulder while the reduced portion of the stem is unthreaded.

A valve disk 39, having an axial hole 41, is slidably mounted on the reduced end portion of the stem, the said reduced portion passing through the hole 41. The valve disk 39, is normally held against the shoulder 40, of the stem by a spiral coil spring 41$^A$, which surrounds the reduced portion of the stem, below the disk 39, and is held under compression by a pin 41$^B$, which passes through the lower extremity of the stem, and holds the spring on the stem. By adjusting the stem 21, by means of the thumb nut 39$^A$, the disk 39, is also adjusted with respect to the opening 35, in the bottom of the piston, the space between the disk and the bottom of the piston being thus varied to regulate the flow of oil through the piston on the downward movement of the piston, for a purpose to be hereinafter explained.

The segment 19 is provided with a counter-balancing portion 19$^A$, in the form, preferably, of a segmental block or lug, which prevents the segment 19, from dropping of its own weight, when raised to the position shown in Figure 3, in a manner and for a purpose to be hereinafter described.

Upon the extended end of the damper rod 15, is rigidly secured a tappet 42, in the form of a short arm having a pin 43, extending at right angles thereto, and which is adapted to be engaged, in a manner to be presently described, to swing the damper to an open position.

The short end of a substantially L-shaped lever 44, extends between the ears 9, of the bracket 4, and is pivotally connected to these ears, by a pin 45. The depending portion of this lever terminates in lateral projections 46, which serve as handles or hand grips, or which may also be engaged by a shovel, when it is desired to open the furnace door, as will presently appear.

At the junction of the short and long members of this lever, is pivotally connected the lower end of an arm 47, the upper end of which is forked, as shown at 48, and this forked end receives the pin 43, of the tappet 42.

When the damper is closed, or in a substantially vertical position, the pin 43, lies in the crotch of the fork, and when the lever 44, is raised to open the door, the tappet is swung to the position shown in full lines, Fig. 3, by the engagement of the crotch 48, of the fork with the pin 43, thereby opening the damper, and the lever 44, drops again, to the position shown in Fig. 3, when released by the attendant, but the pin 43, still remains in the upper end of the fork, as shown. As the damper swings to a closed position, the pin 43, is thereby given a quarter turn, which brings it at rest in the crotch of the fork, as shown in dotted lines Fig. 3, where it remains until the furnace door is again opened. After the damper has been opened by the opening of the furnace door for coaling, it is necessary that the said damper should be gradually closed after closing the furnace door in order that sufficient air may be admitted to the combustion chamber to cause complete combustion of the combustible gases and floating particles of carbon and tar, and this is accomplished in a manner which will now be described:

The cylinder 23, may be simply an air cylinder, or it may be supplied with a suitable liquid to retard the down stroke of the piston, but it is preferably provided with a quantity of suitable oil, and when the tappet is swung to open the damper, in the manner, and for the purpose above described, the toothed segment 19, on the damper rod, which meshes with the rack 20, raises the said rack, together with the piston rod 38, its piston 22, and the valve stem 21, and as the piston rises in the cylinder, the oil above it passes through the aperture 35, in the bottom end of the said piston and out over the circumferential edge of the disk valve 39, which is of less diameter than the piston, and which is now supported by the compressed spring 41$^A$, which is held by the pin 41$^B$, the said disk valve being at a sufficient distance below the bottom of the piston to permit the free passage of the oil through the aperture 35. Immediately after the furnace door is closed, and the lever 44, has swung to its normal position, the piston 22, begins to drop by gravity, and the disk valve 39, under the combined pressure of the oil and the compression of the spring 41$^A$, is forced up against the shoulder 40, of the stem 21, by which the space between the disk and the bottom of the piston is defined, and the downward pressure on the oil, by the piston and its valve, forces the oil up between the disk and the bottom of the piston, and through the hole 35, in the piston and thus the piston is permitted slowly to descend; the time required for its descent to the bottom of the cylinder, being determined by the space between the bottom of the piston and the disk 39, the said space being determined by the adjustment of the stem 21. As the length of time for admitting air to the combustion chamber, after coaling, varies with furnaces of different capacities, and different draft conditions, the adjustment of the disk valve with respect to the piston will be varied to meet the requirement in each case.

The holes 34, in the cylinder head 24, permit the oil which works up through the piston rod opening in the said head, to drip back into the cylinder, the head being concaved in order that it may catch the oil, and prevent its running to waste.

The pivoted end of the lever 44, is formed with oppositely extending lugs 49, which lie at an obtuse angle to each other, and these lugs are provided with threaded holes in which are screwed stop-bolts 50, and 51; the bolt 50, being adapted to engage the lateral projection 8, of the bracket, to limit the upward swinging movement of the lever 44, while the bolt 51, engages the said projection 8, to limit the downward swinging movement of the said lever 44. By properly adjusting these stop bolts, the arm 47, can be raised only far enough to fully open the damper, and lowered so far, that when the pin 43, rests in the crotch 48, the damper will be substantially closed. Moreover, after the bolt 50, strikes the projection 8, a slight jerk on the lever 44, will result in lifting the latch 52, of the furnace door clear of its keeper 53, so that the said door may be opened.

The box for heating the air as it passes into the combustion chamber, comprises the section 13, previously described, and a section 54, which fits telescopically in the end of the section 13, and which is preferably made of material that will stand continuous high temperature. These sections are rectangular in cross section, and the upper and lower sides of the section 13, are each provided with a hole 55, and these holes are in vertical line. The upper and lower sides of the section 54, are each provided with a plurality of holes 56, which are arranged in vertically alined pairs, and by passing a bolt 57, through the holes in the section 13, and a pair of the holes in the section 54, the two sections are securely held together, the holes 56, permitting the box to be both lengthened and shortened.

The forward end of the section 54, is semicircular in vertical outline, and is provided with a horizontal air outlet slot 58. This section is also provided with a plurality of spaced vertical plates 59, which extend from the curved end of the section to about midway of its length, and these plates serve as heating elements, by which the air is thoroughly heated as it passes through the box into the combustion chamber.

Upon the front end of the box section 54, are secured nozzle sections 60 and 61, which are the full width of the box. The upper section 60, comprises a flat horizontal top member, and depending side members which are of the same width or depth as the slot 58, and this nozzle section terminates at its rear end in a curved member 62, that is rigidly bolted to the curved end of the box section 54.

The lower nozzle section 61, comprises simply a horizontal plate that lies between the depending slides of the section 60, and a curved portion 63, that is adjustably secured to the curved end of the box section 54. The adjustment of the section 61, is accomplished by providing the curved member 63, with slots 64, through which are passed retaining screws 65, which are screwed into the curved end of the section 54. The section 60, is slightly longer than the section 61, and the nozzle, as a whole, has a slight downward inclination from the air-box in order to direct the air against the coal bed, and the air is heated to a high temperature in the box before passing out through the nozzle. As shown in Fig. 2, the nozzle is open to the full width of the slot 58, in the box section 54, and by loosening the screws 65, the nozzle section 61, can be slid up between the sides of the section 60, and thus contract the outlet from the air-box, and in this manner, the volume of air entering the combustion chamber, can be regulated to meet requirements. The nozzle sections 60 and 61, are each preferably provided with baffles 66, as shown. The nozzle prevents diffusion of the air, and delivers it over the coal bed in a thin sheet, causing it to mix with the combustible elements, and thus insure complete combustion.

By constructing the air-box in two sections, the section 54, which is subjected to the greatest heat, can be removed when necessary, and replaced with a new section.

The hole 12, in the hot air box section 13, is preferably placed on one side of the center of the box, so that the end of the nozzle will clear the side of the door frame, when the door is opened and closed. The bracket 4, should be made rights and lefts, so as to be applied to furnaces whose doors open either toward the right or left.

In Fig. 12 is illustrated a slight modification in the segment and rack for lifting the piston valve, and in this arrangement is employed a segment 67, the curved edge of which is untoothed, and a segmental toothed plate 68, is secured on one side of the segment and extends beyond the curved edge thereof, and a similar, but untoothed segment plate 69, is secured upon the opposite side of the segment. The curved edge of the segment engages the adjacent side of a member $20^c$, on the upper end of the hollow piston rod 38, and the segments 68, and 69, lie on opposite sides of the said member $20^c$, so as not to frictionally engage the same. A toothed rack 70, is secured upon the side of the member $20^c$, and meshes with the segment 68, and the pitch line of the teeth of this rack is parallel with and in line with the axis of the piston rod, and both the axis of the piston rod, and the pitch line of the rack teeth are the same distance from the axis of the segment 67. The segments 68 and 69, steady the movement of the piston rod, and as the pitch line of the rack coincides with the axis of the piston rod, the segment 68, exerts a direct lifting action on the piston rod by which the said rod is moved in a true vertical line, and friction is thereby reduced to a minimum.

By counterbalancing the segment, the weight of the piston acts positively to lower the segment, as the counter balance $19^A$, prevents the segment from moving down by gravity, and thereby exerting a downward push on the piston rod and piston valve, as would otherwise be the case.

In Fig. 13, a further modification of the lifting segment is illustrated. In this view, an untoothed segment 71, is employed, which is provided with segmental side strips 72, which extend beyond the curved edge of the segment and lie on opposite sides of the member $20^c$, to guide or steady the movement of the piston rod, one of these strips being omitted, as shown.

A flexible connection 73, is secured at one end to the top edge of the segment, and passing down between the segment and the member $20^c$, is secured at its lower end to the lower end of the member $20^c$. The connection 73, may be either a chain, or a steel ribbon, the latter being shown in the figure. In this arrangement, the segment, when raised, draws on the connection 73, which draws on the piston rod and raises the piston. When the piston drops by gravity, a pull is exerted on the connection which turns the segment and closes the damper.

A still further modification is shown in Fig. 14, in which we employ a segment 74, having segmental flanges 75, which lie on opposite sides of the member $20^c$, as in Fig. 13. Upon the top edges of these flanges are secured the upper ends of a pair of steel ribbons 76, which extend down on opposite sides of the member $20^c$, in direct parallel alinement with the axis of the piston rod, and the lower ends of these ribbons are secured to lugs 77, on opposite sides of the lower end of the member $20^c$. By this arrangement, a direct pull is exerted on opposite sides of the axial center of the piston rod, and the piston rod is thus raised in a true vertical line thereby eliminating friction, which would result if the piston rod moved in any other than a true vertical line.

In Figures 12, 13 and 14, the damper rod is only long enough to extend through the segment, and a laterally projecting stem or tappet 78, is formed on the outer face of the segment, which is adapted to rest in the forked end of the arm 47. By this means the tappet 42, is eliminated, the arm 47, acting to swing the segment and lift the piston by engaging the stem or tappet 78, which rests in the forked end of the said arm 47. A shouldered screw 79, is screwed into a hole in the end of the stem 78, and the forked end of the arm 47, slides on the said screw between its head and the end of the stem, by which the arm is kept from wabbling.

Having described our invention, what we claim as new, and desire to secure by Letters Patent, is:

1. In a device of the character described, the combination with a furnace door, of an air receiving box on the inner side of the door, a pipe extending through the door into the box, a damper in said pipe, means for opening the door, means operated by the door opening means for swinging said damper to an open position, automatically operating means for gradually closing the damper, and an air discharging nozzle on said box.

2. In a device of the character described, the combination with a furnace door, of an air receiving box thereon, having a variable discharge nozzle, an air inlet pipe extending through the door into said box, a rod extending transversely through the pipe, having a damper thereon, a tappet on said rod, a forked arm for engaging the tappet to swing the damper to an open position, a hinged door-opening lever for operating said forked arm, and means for gradually closing the damper within a predetermined period.

3. In a device of the character described, the combination with a furnace door, of an air receiving box thereon having a variable discharge nozzle, an air inlet pipe extending through the door into the said box, a rod extending through said pipe having a damper thereon, a tappet on said rod, a door-opening lever, a forked arm operated by said lever, for engaging the tappet to swing the damper to an open position, and liquid-controlled means for gradually closing the damper within a predetermined period.

4. In a device of the character described, the combination with a furnace door, of an air heating box thereon, having a variable discharge nozzle, an air pipe extending through said door into said box, a rod extending through said pipe, having a damper thereon, and a tappet, a hinged lever for opening the door, an arm pivotally connected at one end to said lever, and having a forked opposite end for engaging the tappet to swing the damper to an open position; liquid controlled gravity means, and means operated by the damper rod for raising said gravity means simultaneously with the opening of the damper, said gravity means effecting the gradual closing of the damper within a predetermined period.

5. In a device of the character described, the combination with a furnace door, of an extensible air heating box thereon, having a variable discharge nozzle, an air pipe extending through said door into said box, a rod extending through said pipe having a damper thereon, a tappet on one end of said rod, a hinged door-opening lever, an arm pivotally connected at one end to said lever and forked at its opposite end to engage the tappet to swing the damper to an open position, a cylinder supported on the furnace door having a gravity piston therein, means on the damper rod for raising the piston simultaneously with the opening of the damper, said piston acting to gradually close the damper within a predetermined period.

6. In a device of the character described, the combination with a furnace door having an aperture, of a bracket on the outer side of said door having an inlet pipe and a threaded aperture concentric with said pipe, which registers with the aperture in the door, an air heating box on the opposite side of the door, having a variable discharge nozzle, a pipe which is screwed into the aperture of said bracket and extends into said box, a rod extending through the inlet pipe, having a damper thereon, a tappet on the rod, a door opening lever, an arm pivotally attached at one end to said lever, its opposite end being forked to engage said tappet to swing the damper to an open position, a combined liquid and gravity controlled device, means operated by the damper rod for lifting the gravity controlled device simultaneously with the opening of the damper, said gravity device acting to gradually close the damper within a predetermined period.

7. In a device of the character described, the combination with a furnace door, having an aperture, of a bracket secured on the outer side thereof, having an inlet pipe and a threaded aperture concentric with said pipe which registers with the aperture in the door, an air heating box on the opposite side of the door having a variable discharge nozzle, an air inlet pipe which is screwed into the aperture in the bracket and extends into the box, a rod extending through the pipe having a damper thereon, a toothed segment and a tappet, a hinged lever for opening the door, an arm pivotally attached at one end to said lever, its opposite end being forked to engage said tappet to swing the damper to an open position, a liquid-holding cylinder secured to said bracket, a valved piston in said cylinder having a rod provided with teeth which mesh with the said toothed segment, whereby said piston is lifted when the damper is opened, and acts to gradually close said damper as said piston descends by gravity.

8. In a device of the character described, the combination with a furnace door, an air inlet pipe extending through said door, a damper in said pipe, door opening means, means operated thereby for opening said damper and gravity operated means for gradually closing said damper, of an air heating box on the inner side of the door into which said air inlet pipe extends, a variable discharge outlet nozzle on said box, and air heating elements in said box.

9. In a device of the character described, the combination with a furnace door, an air inlet pipe extending there-through, a damper in said pipe, door-opening means, means operated thereby for opening said damper, and gravity operated means connected with the damper opening means for gradually closing said damper, of an air heating box on the inner side of the door into which said air inlet pipe extends, a variable discharge outlet nozzle on said box and spaced vertical plates in the discharge end of said box which constitute heating elements for the air passing through said box.

10. In a device of the character described, the combination with a furnace door, an air inlet pipe extending therethrough, a damper in said pipe, door opening means, means operated thereby for opening said damper, and gravity operated means connected with the damper opening means for gradually closing said damper, of an air heating box on the opposite side of the door into which said air inlet pipe extends, comprising telescoping sections, and means for securing said sections together at the desired point of adjustment, the outer end of the innermost section being semicircular in outline and having a horizontal slot, upper and lower nozzle sections secured to the said semi-circular end so as to surround said slot, one of said nozzle sections being adjustable with respect to the other, and spaced vertical plates in the semi-circular end of said box.

11. In a device of the character described, the combination with a furnace door, an air heating box on the inner side of the door having an outlet nozzle, an air inlet pipe extending through the door into said box, a rod extending through the pipe having a damper thereon, a counterbalanced toothed segment and a tappet, of a hinged lever for opening said door, an arm pivotally connected at one end to said lever, and being forked at its opposite end to receive said tappet, said tappet resting in the crotch of the fork, when the damper is closed, means for limiting the opposite swinging movements of the lever, an oil-holding cylinder secured to the door, a valved piston therein having a rod a portion of which is toothed, said toothed segment on the damper rod engaging the toothed piston rod, whereby said piston is raised with the damper-opening operation but drops by gravity thereby closing the damper.

12. In a device of the character described, the combination with a furnace door having an aperture therein, a bracket on the outer side of the door having a pipe thereon, a threaded aperture concentric with the pipe which registers with the aperture in the door, and a ledge or shelf, of an air inlet pipe which is screwed into said bracket aperture, an air heating box on the opposite side of the door having a hole through which said pipe extends, and a clamping nut on said pipe for securing said box to said door, said box having an air outlet nozzle, a rod extending through the pipe having a damper thereon, a counterbalanced toothed segment and a tappet, a hinged door opening lever, an arm pivoted at one end to said lever, its opposite end being forked to engage the said tappet to swing the damper to an open position, lugs on the pivoted end of said lever, and stop bolts therein which engage the bracket to limit the opposite movements of the lever, an oil holding cylinder secured to said shelf, an open ended hollow piston therein, a vertically movable disk valve suspended from the bottom end of the piston, and adapted to drop away from the piston on its up stroke, and partially close its bottom end on the down stroke, and a rod connected with said piston having a toothed portion in mesh with said toothed segment.

13. In a device of the character described, the combination with a furnace door, having an air inlet pipe, a rod pivoted in said pipe having a damper thereon, a door opening lever and means operated thereby for turning the rod to open the damper, of a counterbalanced toothed segment on said damper rod, an oil cylinder on said door, a valved piston in said cylinder having a rod provided with a toothed portion in mesh with the toothed segment, said piston being arranged to permit the oil to pass freely through it on its up stroke, and to retard the passage of oil therethrough, on its down stroke, whereby the closing of the damper is gradually accomplished, means on the door for heating the air as it leaves the pipe, and means for distributing the said heated air.

14. In a device of the character described, the combination with a furnace door having an air inlet pipe, a rod pivoted in said pipe having a damper thereon, a door-opening lever, and means operated thereby for turning the rod to open the damper, of a toothed segment on said damper rod, an oil cylinder on said door, an open ended piston in said cylinder having a rod provided with a toothed portion in mesh with said toothed segment, a vertically adjustable stem extending through the piston rod and piston, a disk slidably mounted on the lower end of said rod, a shoulder on said stem for limiting the upward movement of the disk, whereby the space between said disk and the bottom of the valve is defined, and a spring on said stem beneath said disk for normally holding said disk against said shoulder, said disk being moved away from the piston on its up stroke, through the oil, to permit free passage of the oil therethrough, and moved against said shoulder on its down stroke by the combined pressure of the oil and tension of the spring, whereby the space between the disk and the bottom of the piston is greatly lessened, and the passage of the oil therethrough greatly retarded.

15. In a device of the character described, the combination with a furnace door having an air inlet pipe, a rod pivotally mounted in said pipe having a damper thereon, a door opening lever and means operated thereby for turning the rod to open the damper; of means for gradually closing said damper, comprising a toothed segment rigidly mounted on said damper rod, an oil holding cylinder on said door, an open ended piston therein having a hollow rod provided with a toothed portion in mesh with said toothed segment, a stem threaded in an axial hub on said piston, which extends up through said hollow rod and is provided on its upper end with a thumb nut, the lower portion of said stem extending beyond said piston and being reduced in diameter to form a shoulder which is slightly below the lower end of the piston, a stop in the reduced end of said stem, a disk slidably mounted on said reduced portion, and a spiral coil spring interposed between said stop and said disk, to normally hold the disk against the shoulder of said stem, said disk being moved away from the end of the piston on its up stroke, by the pressure of the oil, whereby the oil is permitted to flow freely through the said piston.

16. In a device of the character described, the combination with a furnace door, having an air inlet pipe, a rod mounted therein, a damper on said rod, door opening means and means operated thereby for turning the rod to open the damper, of means for gradually closing the damper, comprising an oil holding cylinder, a piston therein, a valve adapted to permit free passage of oil through the piston on its up stroke and to retard the passage of oil through said piston on its down stroke, means for adjusting said valve to vary the retardation of the oil, a rod extending from said piston having a toothed portion, and a toothed segment on the said damper rod in mesh with the toothed portion of the piston rod.

17. In a device of the character described, the combination with a furnace door, an air inlet pipe on the outer side of said door, a threaded pipe connected to said air inlet pipe and extending through said door, a nut on said threaded pipe and engaging the inner face of said door, a rod in said pipe having a damper thereon, of means for turning said rod to open said damper, an oil cylinder on said door having a valved piston provided with a rod, and means connecting the damper rod and piston rod, whereby the piston is raised simultaneously with the opening of the damper, and the damper gradually closed by the dropping of the piston.

18. In a device of the character described, the combination with a furnace door, an air inlet pipe in said door, and a rod in said pipe having a damper thereon, of door opening means, and means operated thereby for turning said rod to open said damper, an oil cylinder on said door having a valved piston provided with a rod, a counterbalanced segment on the damper rod, and means connecting the same with the piston rod, whereby the piston is raised simultaneously with the opening of the damper, and the damper gradually closed by the dropping of the piston.

19. In a device of the character described, the combination with a furnace door having an air inlet pipe, a rod in said pipe having a damper thereon, and a counterbalanced segment on said damper rod, of an oil cylinder on said door having a valved piston provided with a rod, door opening means and means operated thereby for lifting the segment whereby the rod is turned and the damper opened, and means connecting the segment and piston rod, whereby the piston is raised when the segment is raised, and the segment is lowered by the dropping of the piston, thereby gradually closing the damper.

20. In a device of the character described, the combination with a furnace door having an air inlet pipe, a rod in said pipe having a damper thereon, and a counterbalanced segment on said damper rod, of an oil cylinder on said door having a valved piston provided with a rod, a tappet on said segment, door opening means, and an arm operated thereby which engages said tappet, whereby the segment is lifted and the damper thereby opened, and means connecting the segment and piston rod, whereby when the segment is lifted, a lifting action is exerted on the piston rod in a line parallel with its axis, the said segment being oppositely swung by the dropping of the piston, thereby closing the damper.

21. In a device of the character described, the combination with a furnace door, an air pipe therein, a rod in said pipe having a damper thereon, a member on said rod, and means for raising said member to open said damper, of means for gradually closing said damper during a predetermined period, comprising an oil holding cylinder secured on said door, a piston therein having a passage therethrough, a rod extending from said piston, and adapted to be connected with the member on the damper rod, whereby the raising of said member raises the piston and its rod, a vertically adjustable stem extending through said piston rod and passage, and a spring actuated disk valve slidably mounted on said stem and adapted to control the flow of oil through the said passage, on the down stroke of the piston, to either accelerate or retard its movement.

22. In a furnace door attachment, a bracket comprising an annular member and a portion extending laterally therefrom, a flange extending from said annular member and providing an air inlet pipe, a damper in said pipe, means for securing said bracket to a furnace door, and means supported by said lateral portion of the bracket for controlling said damper.

23. In a furnace door attachment, a bracket comprising an annular member and a portion extending laterally therefrom, a flange extending from said annular member and providing an air inlet pipe, a damper in said pipe, an air receiving box, means for securing said bracket and said air receiving box to the outer and inner faces, respectively, of the furnace door, and means supported by said lateral portion of the bracket for controlling said damper.

24. In a furnace door attachment, a bracket comprising an annular member and a portion extending laterally therefrom, a flange integral with and extending outwardly from said annular member, said flange providing an air inlet pipe, an air receiving box, a threaded pipe secured to said annular member and projecting through the furnace door and a portion of said air receiving box, a nut on said pipe for clamping said bracket and said air box to the outer and inner faces, respectively, of the furnace door, a damper in said air inlet pipe, and means supported by said lateral portion of said bracket for controlling said damper.

25. A furnace door attachment comprising a bracket having an outwardly projecting pipe, an air receiving box, a threaded pipe secured to said bracket and projecting through the furnace door and a portion of said box, a nut on said outwardly projecting pipe, a damper in said pipe, means supported by said bracket for controlling said damper.

26. A furnace door attachment comprising an air receiving box formed of telescoping sections, means for attaching said box to a furnace door, means for securing said sections together at the desired point of adjustment and a discharge nozzle on said box.

27. A furnace attachment comprising an air receiving box, means for attaching said box to a furnace door, means for varying the length of said box, and a discharge nozzle on said box.

28. A furnace door attachment comprising an air receiving box formed of telescoping sections, means for attaching said box to a furnace door, means for securing said sections together at the desired point of adjustment, heating elements in said box, and a discharge nozzle on said box.

29. A furnace door attachment comprising an air receiving box, means for attaching said box to a furnace door, means for varying the length of said box, and a discharge nozzle on said box, said nozzle comprising upper and lower sections one of which is adjustable with respect to the other.

In testimony whereof we affix our signatures in presence of two witnesses.

JOHN J. A. MILLER.
WILLIAM A. WEIGELE.

Witnesses:
G. SARGENT ELLIOTT,
ELIZABETH SMITH.